Jan. 10, 1928.  1,655,878
O. M. REIF
METHOD OF AND APPARATUS FOR REMOVING ARTICLES FROM MOLDS
Filed Oct. 21, 1926   3 Sheets-Sheet 2
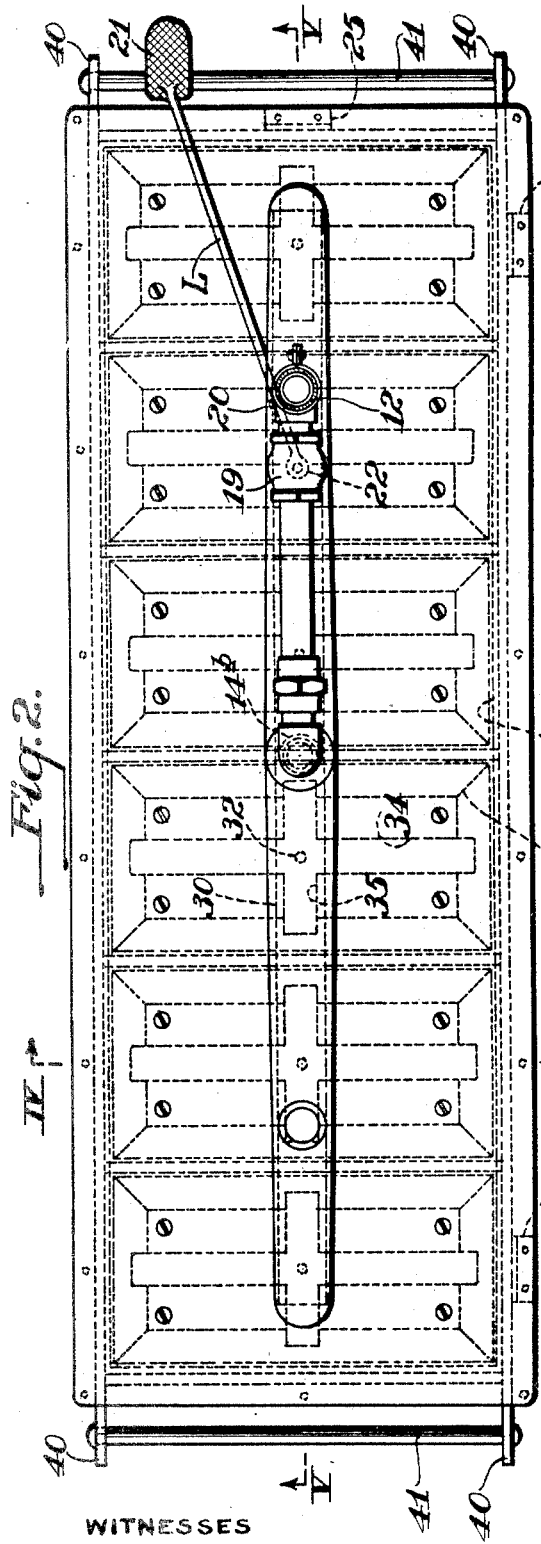
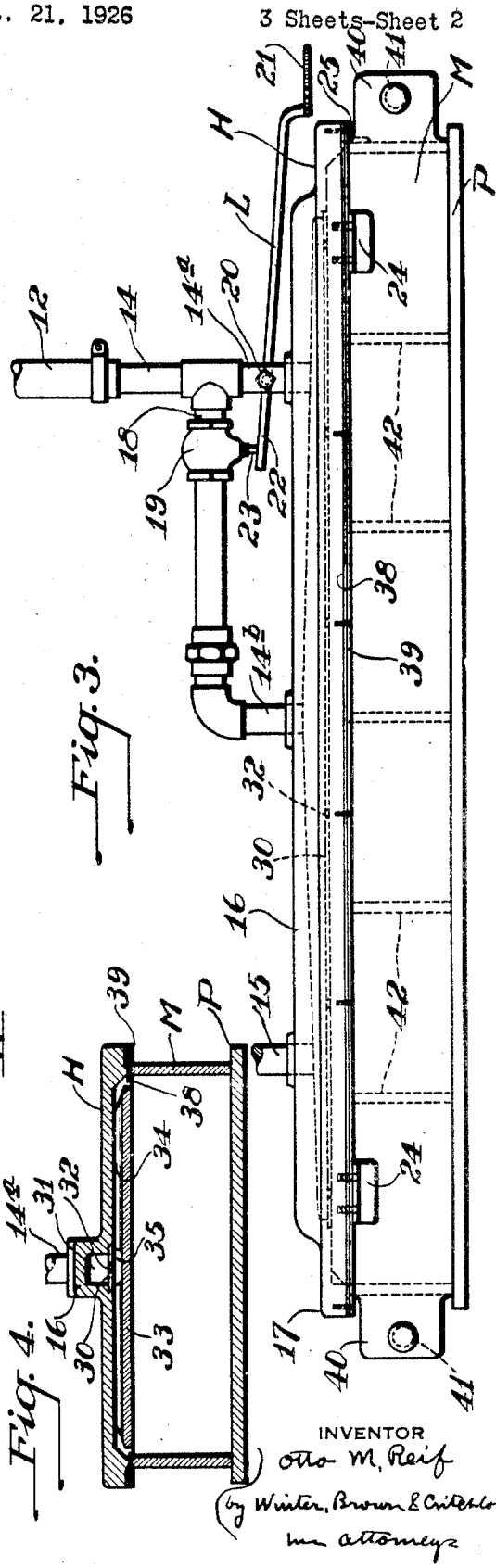
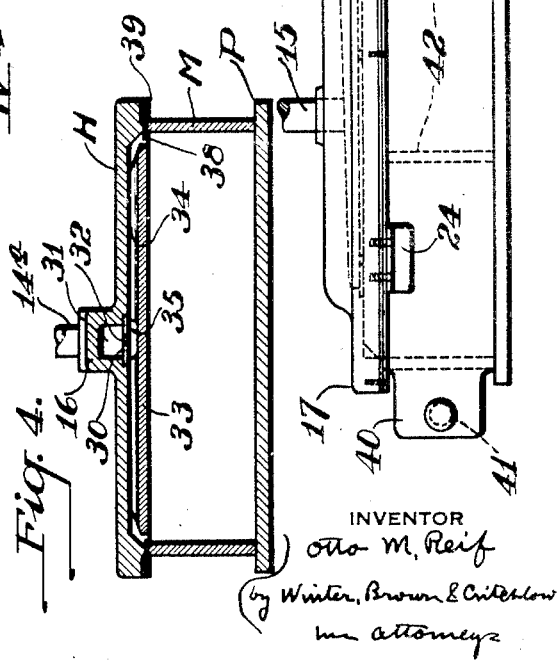
WITNESSES
INVENTOR
Otto M. Reif Jan. 10, 1928.
O. M. REIF
1,655,878
METHOD OF AND APPARATUS FOR REMOVING ARTICLES FROM MOLDS
Filed Oct. 21, 1926 3 Sheets-Sheet 3
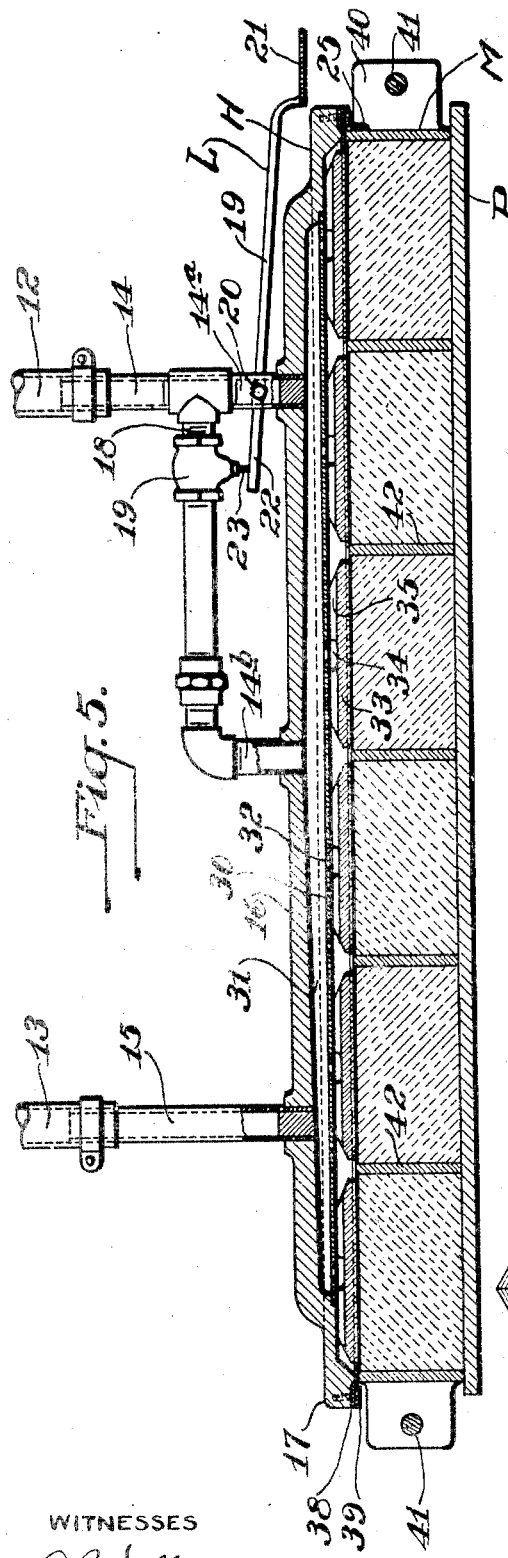
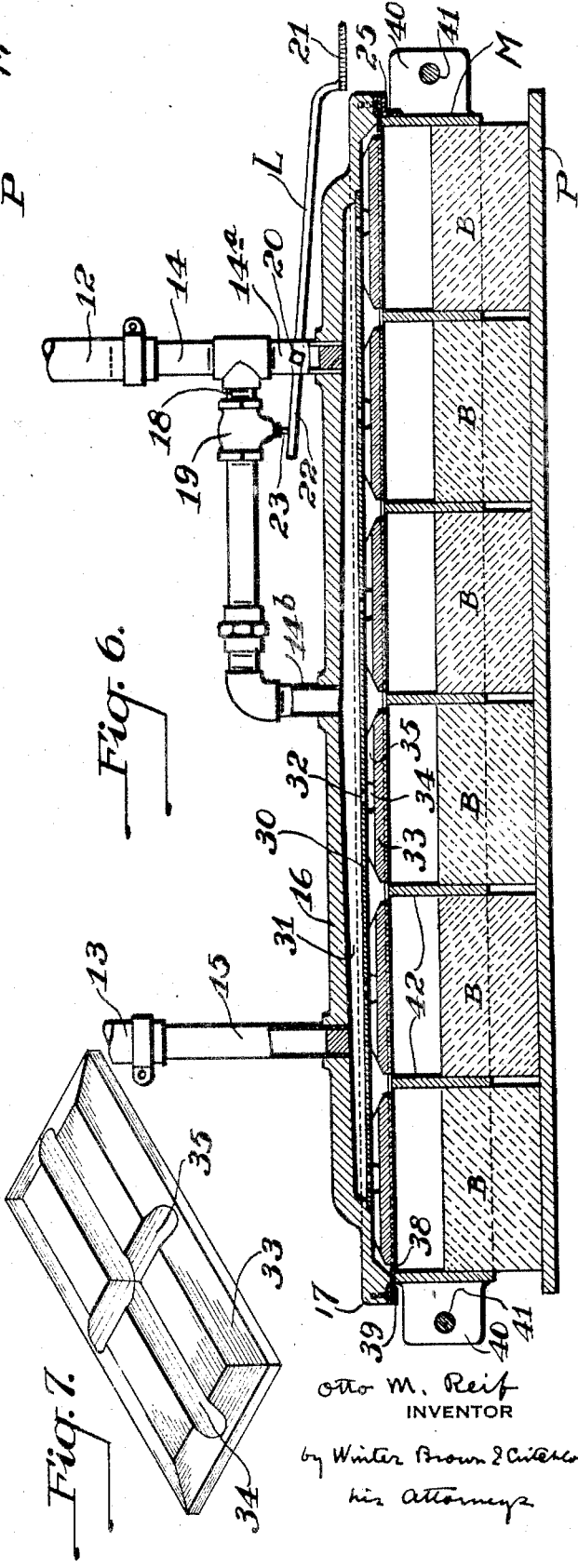
WITNESSES
*A. B. Wallace.*
*Jo. Baily Brown*
Otto M. Reif
INVENTOR
by Winter Brown & Critchlow
his attorneys Patented Jan. 10, 1928.

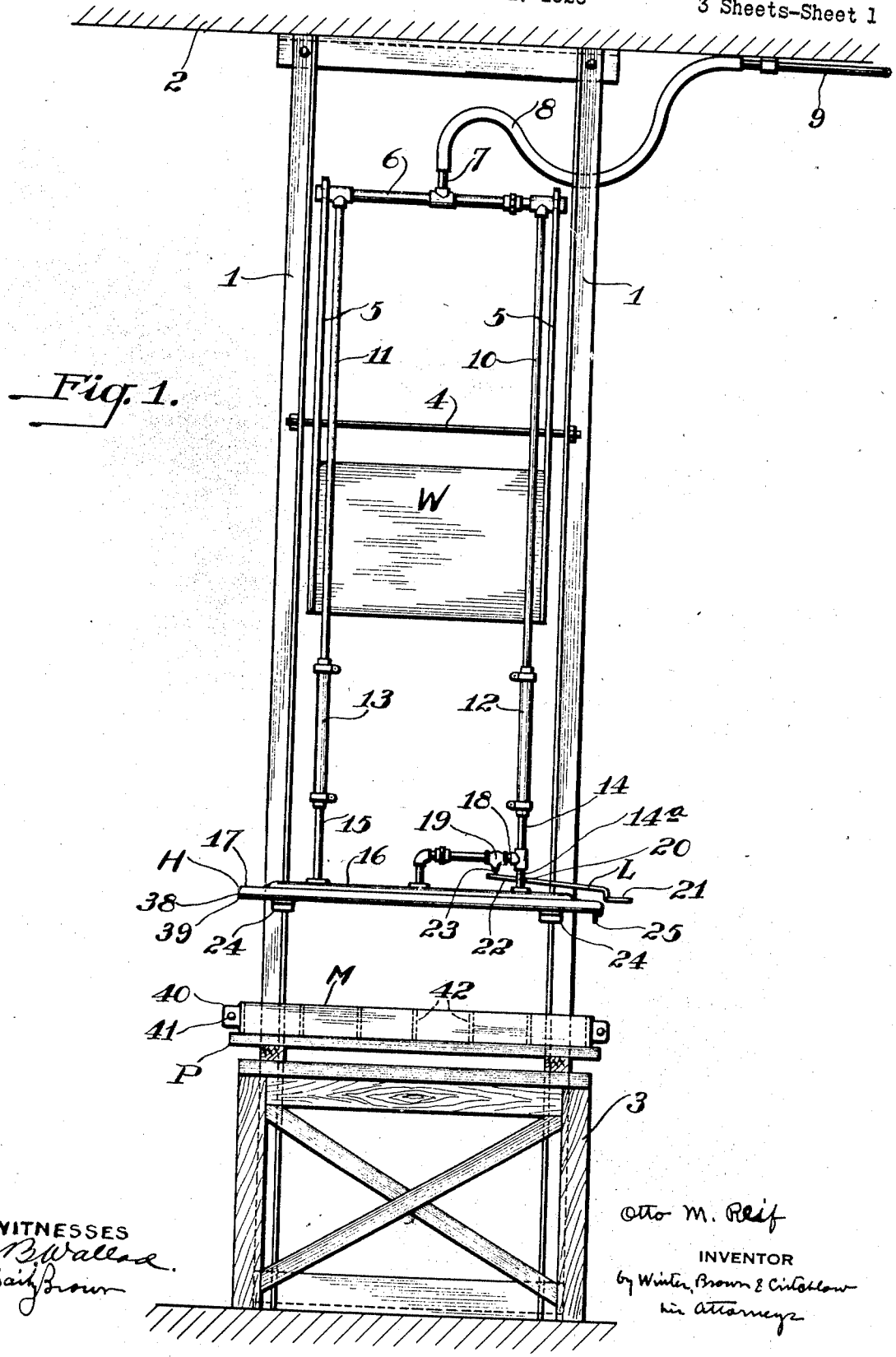

1,655,878

UNITED STATES PATENT OFFICE.

OTTO M. REIF, OF PITTSBURGH, PENNSYLVANIA, ASSIGNOR TO HARBISON-WALKER REFRACTORIES COMPANY, OF PITTSBURGH, PENNSYLVANIA, A CORPORATION OF PENNSYLVANIA.

METHOD OF AND APPARATUS FOR REMOVING ARTICLES FROM MOLDS.

Application filed October 21, 1926. Serial No. 143,134.

This invention relates to an apparatus and method for removing raw moist bricks and the like from the molds in which they are formed.

The objects of the invention are to provide means and a method by which bricks, or like articles molded from plastic material, after being formed may be removed from the mold with a minimum of effort on the part of the operator, with an even movement of the mold relative to the articles formed therein, avoiding distortion and breaking of the edges of the bricks, or such articles, while at the same time greatly increasing the speed with which the operator may safely remove the mold from the molded articles. The result is a more uniform product with less scrap than with prior methods and apparatus.

Referring to the drawings, Fig. 1 is a front elevation showing the device as mounted and used; Fig. 2 is a partial plan view; Fig. 3 is a partial side elevation; Fig. 4 is a cross section on the line IV—IV of Fig. 2; Fig. 5 is a longivertical section on the line V—V of Fig. 2; Fig. 6 is a section corresponding to that of Fig. 5, the mold being partially raised from the bricks; and Fig. 7 is a perspective view of one of the units used to make up the apparatus.

The practice heretofore in the manufacture of silica refractory bricks and the like, has been to mold the bricks in a multi-cavity mold, smoothing off the top with a straight edge slicker or trowel, then inverting the mold and its contents upon a pallet upon which the bricks are to remain while being dried.

After inverting the mold upon the pallet, the mold is removed from the bricks by hand, leaving the bricks in place upon the pallet. In order to start the moist bricks out of the mold, in the hand process, the operator places a push-board on top of the mold. This board has offsets or battens of proper size and position to seat upon the tops of the raw bricks and to fit neatly into the mold cavity. By pressing down on this push-board the bricks are moved relative to the mold. The operator produces this result by grasping the end bars of the mold with his fingers, and pressing downward on the upper ends of the push-board with the palms of his hands. It is usually necessary to give a slight rocking motion to the push-board to get the bricks started out of the molds and this very often causes the bricks to be thinner at the ends than in the middle portion.

The operator lifts the mold at each end, depending upon the weight of the material constituting the moist bricks to cause them to slide out of the mold. Since the moist, plastic material adheres to the mold wall with considerable tenacity, it is sometimes necessary for the hand operator to shake the mold slightly, and to press down on the tops of the bricks. Also he is quite apt to lift one end of the mold slightly before the other, in starting the bricks out of the mold. In case one end, one corner, or one side of the mold is lifted in advance of the other, a distortion of the plastic brick often occurs. Sometimes the edges of the brick are knocked off, or corners raised out of line, etc., by this lifting of the mold out of level by the hand operation. Furthermore, the labor of lifting these metal molds with their heavy contents is considerable, and the operation hard on the men in charge of it. With the prior practice the brick had to be partially lifted with the mold, and all of the adherence of material to the mold had to be overcome by the strength of the operator. Under such circumstances it is almost impossible to get regularity and uniformity of product. In addition, where everything has to be done by hand, a great deal depends upon the personal skill of the operator, and the hand process is necessarily slow, resulting in a comparatively small output per man per day.

A form of apparatus now in use for practicing this invention comprises (Fig. 1) a vertical frame consisting of two upright angle irons 1, 1 attached at their tops to a beam 2. Near the base of the frame a platform or table 3 is provided adapted to receive the pallets carrying the molds containing bricks to be extracted, as hereinafter described. A cross bar 4 is attached to the uprights, and pivotally attached to it are two side frame members 5, 5, which have mounted on their free ends a counter-weight W. At the other ends they are connected by a pivotally mounted cross pipe 6, in the middle of which is a T-connection 7, leading to a hose 8, which in turn is attached to a pipe 9, carried upon the beam 2. To the end of the cross pipe 6 there are attached downwardly extending pipes 10 and 11, which terminate respectively in flexible hose members 12 and 13, which in turn are joined to pipes 14 and 15. The latter extend downward to and are screwed into a hollow raised portion or rib 16 of a dish-shaped hood H.

The pipe 14 has a T-connection 18, with a valve 19 therein, extending beyond the valve to approximately the middle point of the hollow rib 16, which it enters. A lever L is pivoted by a pin 20 to the extension 14$^a$ of pipe 14, and has a free end 22 adapted to press against a plunger 23 operating the normally closed valve 19. At its other end the lever has a terminal 21 adapted to be engaged by the thumb of an operator as hereinafter described. The pipes 14$^a$ and 15 are plugged at the ends that screw into the rib 16.

Depending from one side of the hood H are stop-guides 24, 24, and from one end a similar stop-guide 25. These are for the purpose of assisting the operator in accurately positioning the hood on and over a mold, as will be apparent from the description hereinafter.

Within the hood H and coextensive with the median hollow rib 16 thereof, there is a partitioning plate member 30 forming a chamber 31 inside the rib 16. Into this chamber the open extension 14$^b$ of pipe 14 leads. Perforations 32 are provided through the partition 30, to permit compressed fluid, in this case air, to pass out of the chamber 31 to the under side of plate 30.

Attached to the under face of the partition 30 are a plurality of blocks or plates 33. These have cross grooves 34 and 35 in their backs, and the perforations 32 of the partition 30 are positioned so that air passing through the partition will be delivered at the meeting point of the two crossing grooves 34 and 35, and by these grooves will be carried to the edges of the plates for the purposes hereinafter described. The under faces of the plates 33 are plane and smooth, of the same shape and proportions as the side face of a brick, but of slightly less area than the size of a brick, and are accurately positioned so that their middle points will register with the middle points of bricks in a mold under the hood, when the guides 24 and 25 are in contact with the outer walls of a mold.

Around the edges of the hood H, and on the under side thereof, a flexible gasket 38 is provided. This is retained in position by a rigid superposed strip 39, through which screws extend into the walls of the hood.

The molds M in which the bricks are formed consist of a frame comprising side and end walls, open at top and bottom. From the end walls there are spaced-apart lateral extensions or fins 40, and between these are cross bars 41, adapted to form handles for lifting and carrying the molds. The mold walls are connected by cross partitions 42, forming a plurality of cavities of proper size for making single bricks, positioned with their side faces up and down. The molds are supported, when bricks are to be removed, upon suitable pallets P.

The method of separating the bricks from the mold and operation of the device above described is as follows:

The several compartments of mold M having been filled with plastic materials to be made into bricks B, and having been leveled off by any suitable process, it is placed upon a pallet P, which in turn is placed in proper position upon the support 3. The hood H is normally held by the counter-weight W in a position above and back of the mold as placed upon the table. It is however mounted so that the operator may easily pull it downward and forward to position to be placed over the mold M, upon the support 3. The guides 24 and 25 on one side and one end readily allow the operator to accurately position the hood in exact position relative to the mold.

Having positioned the hood over the mold, the operator grasps with his fingers the cross bars 41 of the mold, and presses down with the palms of his hands upon the top of the hood. The hood seats all round on the mold wall and the flexible gasket makes a tight contact. The operator's thumb on the right hand is then in position to engage the terminal portion 21 of the valve operating lever, and pressure downward upon that, while holding the hood tight against the mold, admits compressed air from the main 9 through hose 8, connections 7 and 10, into the chamber 31 through the inlet pipe 14$^b$. From thence it passes through the perforations 32 into the channels 34 and 35 on the backs of the plates 33, and then outward to contact with the extreme edges of the upper faces of the brick in the mold. The plates 33 cover the greater portion of the faces of the bricks, so that the air pressure initially is applied only to and at the extreme edges of the bricks, adjacent to the partitions and side walls of the mold.

As the operator admits air by pressure on the trigger 21, air pressure builds up inside the hood, the bricks are pressed down and started out of the mold by cushioned pressure on top along each edge, and the mold which is held tightly to the hood is lifted by air pressure and may then be readily and without effort lifted straight upward, leaving the bricks in exactly the position that they have been placed originally upon the pallet P. Since the air pressure initially starts the bricks out of the mold, and assists in lifting the mold from them, it is comparatively easy for the operator to lift the molds straight upward, and there is no necessity whatever for him to shake the molds or to start the bricks out of it by lifting one corner or side before the other. Since the air pressure is applied only at the edges of the brick, until after they have been started out of the mold, there is no distortion of their upper faces, and the molds are removed from the bricks without injury to any of the corners or edges. In addition the bricks may be removed from the molds with greatly increased rapidity as compared to the old hand operation. The saving of physical effort is also of importance, since the operators are assisted in lifting the mold by air pressure inside the hood and therefore do not have to lift with anything like the force that must be used in the old hand operation.

While this apparatus and method are particularly valuable in the manufacture of bricks, and especially silica refractory bricks, it will be understood that other articles than bricks molded from plastic material in molds of uniform cross section may likewise be removed. The word "bricks" as used herein is to be understood as comprising any plastic molded article capable of being forced out of a mold by a device and method such as that described.

I claim:

1. In brick making machinery the combination of a mold in which plastic material is formed into brick shape, a hood adapted to fit over and to be held on the top of the mold, and means to admit compressed fluid to the interior of the hood whereby to separate the mold from the bricks by fluid pressure on the bricks.

2. In brick making machinery the combination of a mold in which plastic material is formed into brick shape, a hood adapted to fit over and to be held on the top of the mold, and means to admit compressed air to the interior of the hood whereby to separate the mold from the bricks by air pressure between the bricks and hood.

3. In brick making machinery the combination of a mold in which plastic material is formed into brick shape, a separate hood adapted to fit over and on the top of the mold and to be normally held thereon by the operator, a source of compressed air, means to admit compressed air from the said source to the interior of the hood, and manually actuated means for controlling the admission of air to the hood.

4. The combination substantially as set forth in claim 1, comprising in addition a series of plates carried on the under side of the hood positioned and adjusted to seat upon the upper faces of the bricks when the hood is in position on the filled mold, said plates being of the same shape but slightly smaller than the upper faces of the bricks whereby fluid pressure is applied initially to the exposed faces of the bricks at their edges only.

5. The combination substantially as described in claim 1, comprising the additional element of means inside of the hood to prevent the air from contacting initially with the upper surface of the bricks except at the extreme outer edges.

6. In brick making machinery the combination of a multi-brick mold open at top and bottom, a hood adapted to fit the top of the mold, a source of compressed air connected to said hood, a valve controlling the connection of air from the source to the hood, plates secured on the inside of the hood attached thereto and adapted to seat upon the upper faces of the bricks in the mold, said plates being of the same shape but of slightly less size than the upper exposed faces of the bricks in the mold, whereby air admitted to the hood is initially applied to bricks at their outer edges for the purpose of starting them out of the mold.

7. In brick making machinery and the like the combination of a mold adapted to receive plastic material to be formed therein, a hood adapted to seat upon the top of the mold, a source of compressed air connected to the hood, a manually operable valve controlling the source of compressed air, and means within the hood to direct air pressure therein against the upper faces of the bricks at their extreme edges only.

8. The combination substantially as set forth in claim 1, comprising as an additional element a fluid-tight flexible gasket between the hood and the top of the mold.

9. The combination substantially as set forth in claim 1, the hood and its connections being pivotally suspended from an overhead support, and a counter-weight adapted automatically to move the hood away from its operative position when it is released by the operator.

10. The method of removing a mold open at its top and bottom from bricks formed therein comprising the steps of covering the mold with a fluid-tight separate hood, admitting compressed fluid to the hood, and then raising the hood and mold from the bricks while holding them in associated fluid-tight relation.

11. The method of removing molds from bricks formed therein comprising the steps of covering the mold with a fluid-tight hood, admitting fluid under pressure to the hood while screening the faces of the bricks against the fluid pressure except at their extreme outer edges, and then moving the mold and hood relative to the bricks.

12. The combination substantially as set forth in claim 1, the hood and its connections being mounted to permit free but limited upward and rearward movement, and means adapted automatically to remove the hood from operative position when it is released by the operator.

13. Apparatus for making brick comprising an imperforate plate, a mold open at top and bottom having compartments adapted to form bricks from plastic material deposited therein and adapted to be seated upon the imperforate base with bricks as formed therein, a hood adapted to be seated upon the top of the mold and to make a substantially fluid-tight connection therewith, a source of compressed fluid connected to the hood, and means to admit compressed fluid to the hood above the tops of the bricks while the hood and mold are simultaneously raised in associated fluid-tight relation, whereby as the mold and hood are simultaneously raised the bricks are expelled from the mold by fluid pressure and gravity.

14. The combination substantially as set forth in claim 1 with the addition of means on the hood for accurately positioning it with respect to the edges of the mold.

15. The combination substantially as set forth in claim 1 with the addition as elements, of stop elements to insure accurate positioning of the hood upon the mold, and means to prevent escape of fluid pressure between the hood and the mold.

16. In brick making machinery and the like, the combination of a mold adapted to receive and be filled with plastic materials to be formed into bricks therein, a fluid-tight hood adapted to seat on the top of the mold, a source of compressed air connected to the interior of the hood, means whereby the hood may be held upon the mold by the hands of an operator, and a manually operable valve controlling the supply of fluid pressure to the hood and positioned to be operated by the thumb of one hand of the operator while holding the hood upon the mold.

17. The method of removing molds from bricks formed therein comprising the steps of placing the mold containing the bricks upon an imperforate base, then covering the mold with a separate fluid-tight hood, then admitting compressed fluid to the hood while holding the hood in seating position on the mold, and then raising the hood and mold together from the brick and the base.

18. The method of removing molds open at their top and bottom from wet bricks filling the mold, comprising the placing of the mold and its contents upon an imperforate base, placing a fluid-tight hood upon the top of the mold, manually holding the hood in position upon the mold so as to prevent escape of fluid pressure therebetween and to prevent separation of the hood and mold, admitting fluid pressure to the interior of the hood, and then raising the hood and mold from the bricks while holding the hood and mold in fluid-tight relation.

19. The method of molding bricks comprising the filling of a multi-cavity open top and bottom mold with suitable plastic material, placing this mold upon an imperforate base, placing a fluid-tight hood upon the top of the mold, admitting fluid pressure to the hood while simultaneously raising the hood and mold, whereby to initiate expulsion of the bricks from the mold by fluid pressure in the hood above the bricks.

In testimony whereof, I sign my name.

OTTO M. REIF.